June 5, 1962  W. BINDER  3,037,601
ELECTRO-MAGNETIC CLUTCH
Filed Aug. 12, 1957  7 Sheets-Sheet 1

INVENTOR
WILHELM BINDER

By Toulmin & Toulmin

Attorneys

June 5, 1962 W. BINDER 3,037,601
ELECTRO-MAGNETIC CLUTCH
Filed Aug. 12, 1957 7 Sheets-Sheet 5

Fig.9

INVENTOR
WILHELM BINDER
BY Toulmin & Toulmin
ATTORNEYS

June 5, 1962  W. BINDER  3,037,601
ELECTRO-MAGNETIC CLUTCH
Filed Aug. 12, 1957  7 Sheets-Sheet 6

INVENTOR
WILHELM BINDER
BY Toulmin & Toulmin
ATTORNEYS

June 5, 1962 W. BINDER 3,037,601
ELECTRO-MAGNETIC CLUTCH
Filed Aug. 12, 1957 7 Sheets-Sheet 7

INVENTOR
WILHELM BINDER
BY Toulmin & Toulmin
ATTORNEYS

United States Patent Office 3,037,601
Patented June 5, 1962

3,037,601
ELECTRO-MAGNETIC CLUTCH
Wilhelm Binder, Villingen, Black Forest, Germany, assignor to Wilhelm Binder K.G., Maschinen- u. Elektro-Apparate Fabrik, Villingen, Germany
Filed Aug. 12, 1957, Ser. No. 677,739
Claims priority, application Germany Aug. 10, 1956
7 Claims. (Cl. 192—84)

The present invention relates to coupling means, and, more in particular, to an electro-magnetically operated clutch.

The present application is a continuation-in-part of my co-pending patent application Serial Number 493,212 filed March 9, 1955, now abandoned.

It is an object of the invention to provide an electromagnetic clutch which occupies little space in relation to the power it transmits.

It is another object of the invention to provide a clutch of the aforesaid kind having an improved degree of magnetic efficiency.

A further object of the invention consists in providing a coupling guaranteeing a quick and exact response to engagement and disengagement of the clutch.

It is still another object of the invention to provide a clutch which operates a long time without requiring adjustment.

With these objects in mind I have already provided a clutch disclosed in my German Patent No. 852,792, issued October 20, 1952, wherein the magnetic drive is separated from the mechanical torque transmitting means.

This known coupling possesses an air gap opening toward the outside which is, therefore, easily accessible.

The above-mentioned objects are achieved by the electro-magnetic clutch of the present invention, having a magnetic casing having a radially extending portion simultaneously constituting a part of the magnetic circuit and serving as a supporting flange for the disk assembly, there is further provided a cup-shaped armature having a magnetic circuit closing portion constituting an elongation of the radially extending portion and a disk contacting and pressure exerting bottom plate being in contact under operating conditions with a disk of that group of disks which will rotate together with the armature also when the clutch is disengaged.

In another embodiment of my invention the end disk on both sides of the disk assembly pertain to that disk group which is constantly rotating together with the armature and the magnetic casing.

In order to avoid adjustment of the coupling in spite of the unavoidable wear at the friction disks, the armature is preferably devised as a resilient element, allowing the armature to continue its travel, i.e. movement in axial direction even after the two groups of the disk assembly have become engaged and transmission of torque has begun until the working air gap of the magnetic system is closed, while the spring constituted by the resilient element is additionally tensioned, thus providing for compensation of the wear on the surfaces of the friction disks occurring during operation of the clutch.

It is furthermore of importance for a prompt response of the coupling, when engaging and/or disengaging the same, that the armature which is moved by magnetic force is completely relieved from transmitting torque to the friction disks.

In another embodiment of the invention this is achieved by providing the magnetic casing with an axially extending annular shoulder piece whose cylindrical outer surface serves for axial guidance of the cup-shaped armature, and on whose inner sidewalls one of the two disk groups is mounted for rotation therewith, while the disk group is axially displaceable relative to the annular shoulder piece. When the clutch is engaged, the armature is brought into contact with this latter disk group. The shoulder piece also forces the armature to follow its rotation, without hindering the axial movement of the armature.

According to another embodiment the electromagnetic clutch of the invention has a stationary coil.

According to a further, preferred embodiment of the electro-magnetic clutch of the present invention, the cup-shaped member consists of an armature ring connected to a disk contacting and pressure exerting member, as for instance a pressure plate, by a plurality of circumferentially spaced tie bolts and wherein the torque transmitting means between the magnetic casing and the outer disks consists of a plurality of circumferentially spaced axially extending arms, which preferably are arranged upon a circle having the same diameter as the circle upon which the tie bolts are arranged.

In still another embodiment of the electro-magnetic clutch of the present invention, the coil casing housing the coil consists of a magnetizable material and constitutes a part of the magnetic circuit.

In another embodiment of the electromagnetic clutch of the present invention, the working air gap is located between the ends and preferably in the center between the axial ends of the coil.

The several objects and advantages referred to will become more apparent upon reference to the accompanying drawings, in which.

Figure 1:
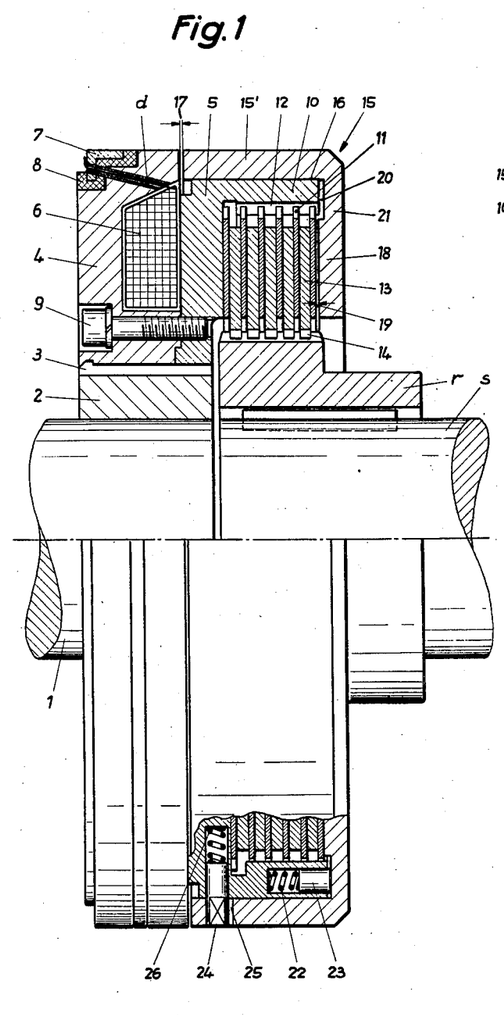
FIGURE 1 shows an embodiment of an electromagnetically operated clutch according to the invention, partially in longitudinal section and partially in side view, said embodiment having the magnetic coil firmly embedded in the magnetic casing.

Referring to the drawings more in detail and specifically to FIGURE 1, reference numeral 1 designates a primary shaft or driving shaft fastened in a known manner in a sleeve 2 by means of a key or the like. The magnetic casing consisting of radially extending parts 4 and 5 is fastened on this sleeve 2 by means of keys 3. The magnetic casing encloses a magnetic coil 6 adapted to produce a magnetic flow through portions 4 and 5 of the magnetic casing. Electric current is supplied to coil 6 by way of a collector ring 7 embedded in an insulating means 8. The collector ring 7 is electrically connected with the coil 6 by way of an insulatedly embedded wire $d$. The other pole of the coil is grounded. Parts 4 and 5 of the magnetic casing are held together by means of screws 9. Part 5 has a cylindrical, axially protruding sleeve 10 whose inner side-wall bears the grooved portion 12 contacting and driving the outer disk group 11. The portion 5 of the magnetic casing thus performs the dual function of constituting a part of the magnetic circuit and, at the same time, forming the support flange of the outer disk group 11. The interior disk group 13 is mounted in grooved connection on a driven sleeve $r$ which is fixed by a key 14 to the secondary or driven shaft. Both groups of disks are fastened for rotation with their grooved mounting elements but axially displaceable with relation to these elements. A cup-shaped armature 15 slides on the outer cylindrical surface 16 of sleeve 10 of the magnetic casing and is mounted for rotation with the latter by a plurality of bolts 24 described in greater detail below, which are circumferentially arranged in the sleeve 10, however, without hindering the axial movement of the cup shaped armature 15 along the sleeve 10. Consequently, the coupling means comprising the groups of outer and interior disks 11 and 13, and the electro-magnetic actuating means causing the engagement of the groups of disks are both mounted coaxially adjoining each other.

The cup-shaped member or armature 15 has a bottom portion 18 adapted to contact the outermost of the disks of the outer disk group 11 and to press this group of disks against the interior disk group 13 thereby connecting the driving and the driven shafts. The bottom plate 18 is located on the side of the disks remote from the magnetic casing to press the disks together so as to effect engagement of the coupling.

The cup-shaped member 15 also has a cylindrical side-wall 15' the free outer extension of which forms an extension of the radially extending wall portion 5 of the magnetic casing. The free outer end portion of the side-wall 15' closes the circuit of the magnetic flow passing through portions 4 and 5 of the magnetic casing.

The coupling is shown in FIGURE 1 with the current switched off, there being a working air gap 17 left between the edge surface of the cylindrical part 15' of the cup-shaped armature and part 4 of the magnetic casing.

The bottom 18 of the cup-shaped armature is confronting the outermost disk with a space 19 existing between both parts when the clutch is disengaged, as in FIGURE 1.

In the vicinity of where the hollow cylindrical side wall 15' and the bottom 18 of the cup-shaped armature meet, the bottom 18 is provided with a recess or groove 20, which is so shaped that the portion 21 connecting the bottom 18 with the cylindrical side-wall 15' of the armature 15 is thinner than 18 and hence forms a resilient connecting member. Springs 22 are arranged evenly, and distributed circumferentially in the sleeve 10 of the magnetic casing, which springs return the armature into its initial position when the clutch is being disengaged.

These springs act by way of short pressure bolts 23 against the bottom of the cup-shaped armature. In order to determine the initial position of the armature, several radially directed bolts 24 are distributed around the circumference of the same, which bolts 24 are mounted in radial bores in part 5 of the magnetic casing and have the ends flattened on opposed sides to form flat projections fitting into slots 25 provided in the cylindrical part 15' of the cup-shaped armature. In order to facilitate assembly and disassembly of the cup-shaped armature 15, springs 26 are arranged below the aforesaid bolts 24 in the bore of the casing part 5. The bolts 24 are secured against falling out, since the slotted hole 25 is smaller in width than the diameter of the bolt 24. Hence, the shoulders on the bolt at the bases of the flattened portions will be restrained by the edges of the slotted hole 25. The bolts 24 are pushed inwardly against the springs 26 to remove the armature 15.

Figure 2:
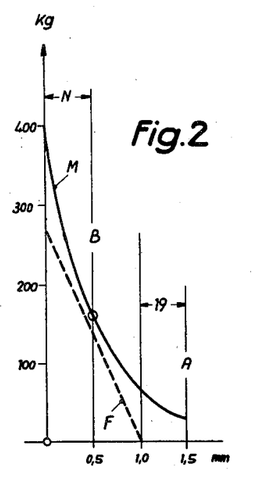
FIGURE 2 is a graph showing the magnetic pulling force and the spring force in relation to the travel of the armature.

FIGURE 2 represents diagrammatically the elastic spring force in relation to the pulling force of the magnet. The abscissa of the graph shows the travel or stroke of the armature in millimeters, while the ordinate gives the power in kilograms. Curve F represents the characteristic of the resilient portion connecting the bottom 18 with the cylindrical side-wall 15', while curve M represents the magnetic pull characteristic. When current is switched off from the coil 6, the cup-shaped armature 15 is in its initial position ready for travel, which is characterized in FIGURE 2 by the letter A.

If the current is switched on and flows through the coil, a magnetic flow is created traveling through portions 5 and 4 of the magnetic casing, and, over the air gap 17 through the free outer end portion of the cylindrical armature portion 15' of the armature 15. The magnetic flow does not travel through the bottom plate 18 and the assembly of disks and the magnetic circuit is therefore comparatively short and the disks cannot stick together under the effect of remanent magnetic forces, after the electric current through the coil has been switched off.

The magnetic force created by the coil first causes the space 19 between the armature and the disk assembly to disappear by closing the gap between both parts. Spring force F of the resilient connecting portion then rises to the operation point B together with the magnetic pulling force M, while the working air gap 17 is being closed. At operation point B the pressure exercised on the friction disks is sufficient to cause the secondary or driven shaft $c$ to be driven. At this point, however, the working air gap 17 is not yet completely closed, unless the clutch has been used for a considerable length of time. Due to the resilient member 21 being provided in the bottom 18 of the cup-shaped armature the cylindrical armature portion 15' of the armature can be further magnetically attracted until the path for the magnetic flux is completely closed, i.e. until it reaches a position wherein the working air gap 17 is equal to zero. The additional travel of the armature from the operation point B to the closing position of the magnetic field circuit takes care of any wear on the surfaces of the friction disks and is indicated in the travel-force diagram of FIGURE 2 by the distance N.

If the flow of current through the coil 6 is interrupted, the springs 22 will urge the armature 15 back to the initial position by means of bolts 23. Since no torque is effective via the armature 15 and only the pulling force of the magnet and/or the return force of the return springs 22 exercises pressure upon the same, this arrangement guarantees that the coupling will be engaged and/or disengaged with great exactness.

Figure 1A:
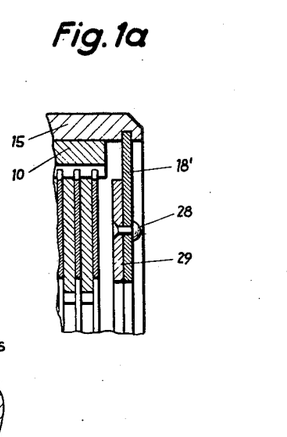
FIGURE 1a represents a slightly varied embodiment of the armature in partial longitudinal section.

FIGURE 1a represents a modified embodiment of the armature. In this embodiment a bottom 18' formed by a ring-shaped resilient steel membrane is fitted onto the one side of the cylindrical part of the armature 15. A pressure ring 29 is fastened by means of rivets 28 to this resilient steel membrane 18'. An armature according to this embodiment will maintain its spring characteristics F unchanged through millions of engagements and disengagements.

Figures 3, 3A, 4, 5:
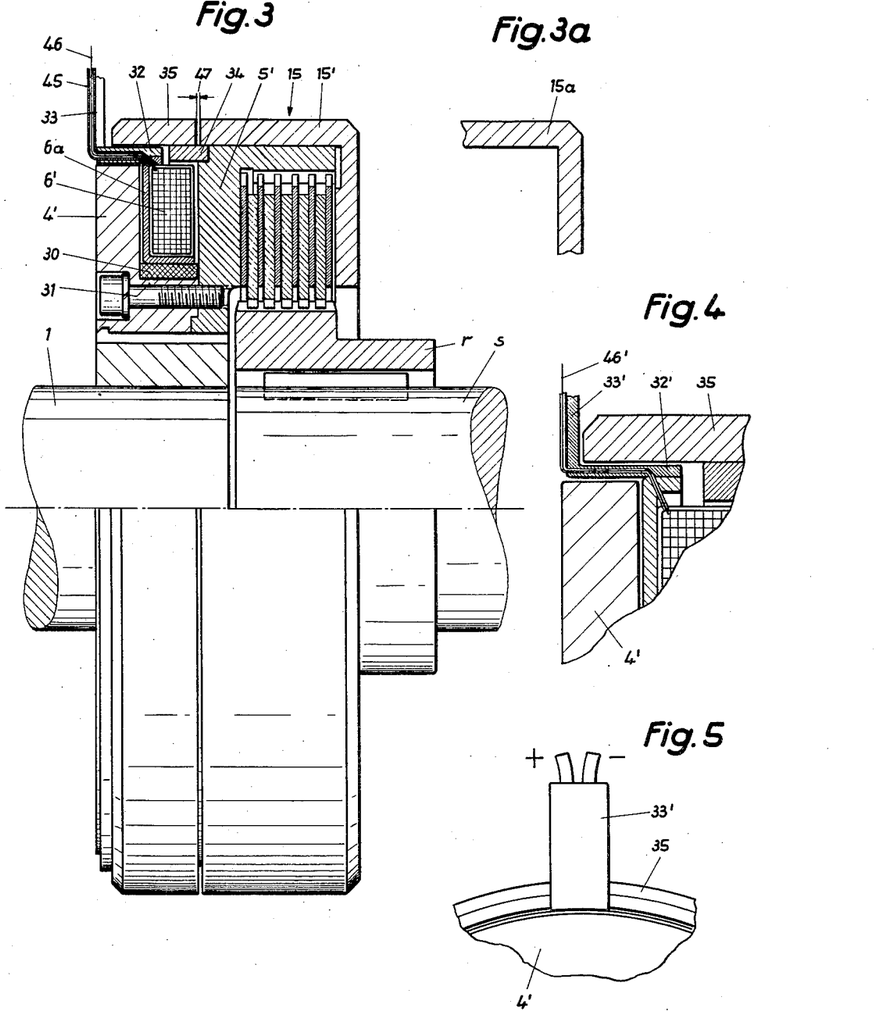
FIGURE 3 represents another embodiment of an electro-magnetic coupling corresponding to that given in FIGURE 1, but wherein the coil is stationary and the magnetic casing rotates.
FIGURE 3a is a partial longitudinal section of the armature in a different embodiment.
FIGURE 4 is a partial longitudinal section of a varied holding device for the magnetic coil.
FIGURE 5 is a partial view in axial direction of the holding device for the coil according to FIGURE 4.

The embodiment of my invention shown in FIGURE 3 represents a multiple disk coupling which is similar to that shown in FIGURE 1 and also contains essentially the same magnetic system. The embodiment of this figure differs from that of FIGURE 1 in that the magnetic coil is stationary. To this end, a magnetic coil casing 6a is press-seated on a supporting sleeve 30 made, for instance, from a powder metal. Part 4' of the magnetic casing is provided with a surface 31 forming a sliding bearing for sleeve 30 of the coil assembly. The magnet coil 6' has a clearance against parts 4' and 5' of the magnetic casing. In order not to disturb the magnetic flow, a ring-shaped iron part 32 is mounted on the coil casing 6a, which part 32 is separated by a small air gap only from part 4' of the magnetic casing. This ring part 32 and together therewith parts 6a and 30 are held against rotation by an arm 33 forming part of the stationary machine frame, which arm 33 also bears the leads for the electric current. In order to complete the magnetic circuit a ring-shaped iron part 35 is mounted on an intermediate sleeve 34 made of non-magnetic metal, such as, for instance, brass, which is fastened to part 5' of the magnetic casing. Part 35 is also separated by only a small air gap from the stationary ring sleeve 32 and bears the one limiting surface of the working air gap 47. The armature 15 is devised similar to that in FIGURE 1.

A different embodiment of the cup-shaped armature 15a may be substituted for the armature 15. The bottom of this new embodiment 15a is not provided with a resilient part, as is shown in FIGURE 3a.

FIGURE 4 shows a somewhat simplified embodiment of the coupling shown in FIGURE 3. A narrow cylindrical element 32' extends in the interspace between the part 35 and the part 4'. This cylindrical element 32' is made from Bakelite or another electrically non-conductive material; the coil casing 6a is mounted on this element 32', which serves to secure the entire coil assembly against rotation. The leads to the coil formed by flat copper strips 46' are mounted electrically insulated in this ring-shaped part 32' and on its arm 33', which holds the ring 32' stationary, since it forms part of the stationary machine frame.

The mode of operation of the embodiments of the clutch represented in FIGURES 3 and 4 is the same as explained in connection with the embodiment shown in FIGURE 1.

In the embodiments of FIGURES 3 and 4 the coil casing 6a may also be supported by a roller bearing replacing the slide bearing sleeve 30.

Figure 6:
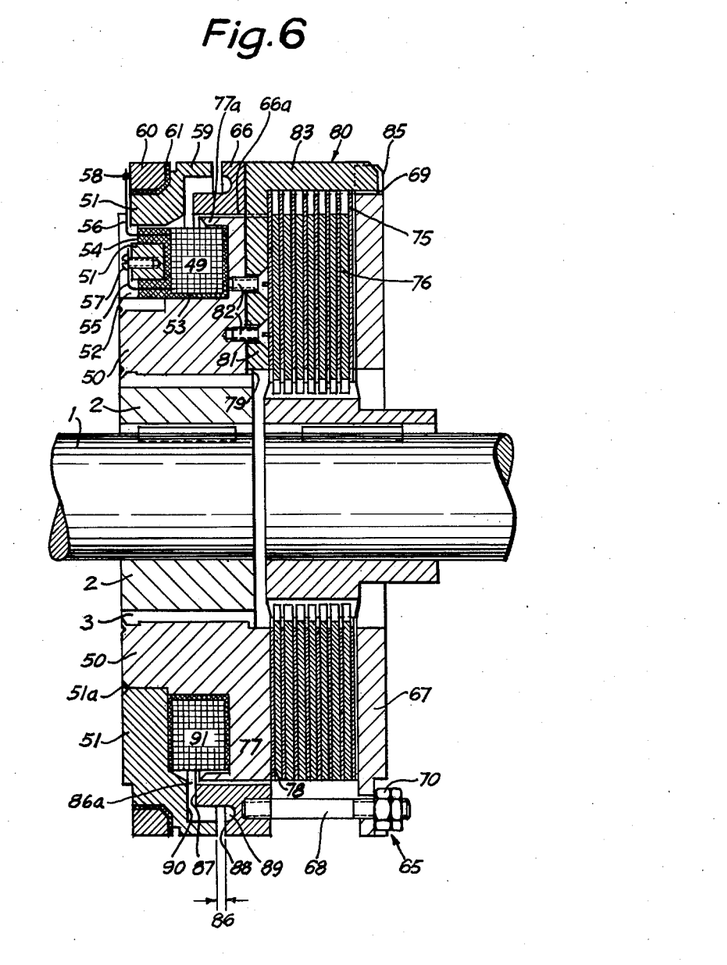
FIGURE 6 is a view partially in longitudinal section and partially in side elevation showing another embodiment of the electro-magnetic clutch of the invention.
Figure 7:
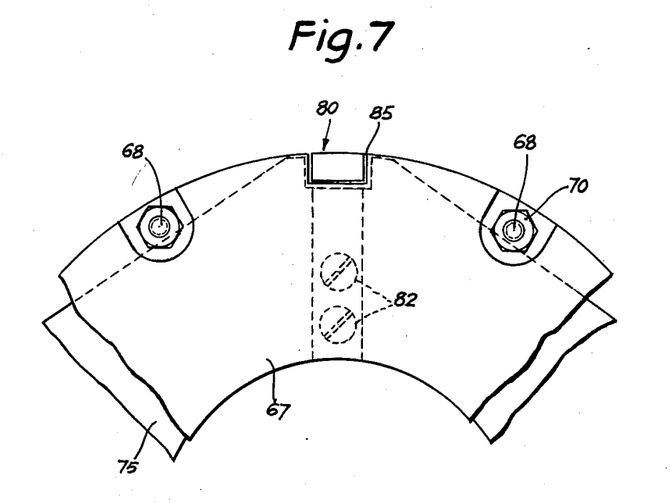
FIGURE 7 is a front view of a portion of the embodiment of the clutch shown in FIGURE 6 showing a part of the pressure plate.
Figure 8:
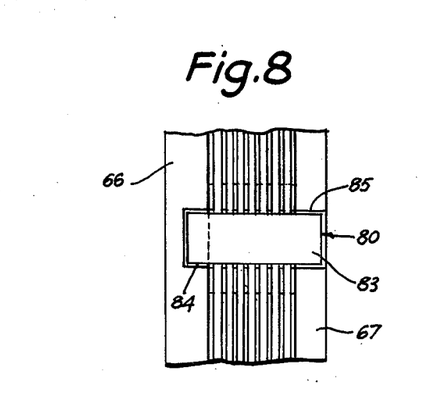
FIGURE 8 is a top view of a portion of the embodiment of the clutch shown in FIGURE 6.

Another embodiment of the invention is shown in FIGURES 6 through 8.

The magnetic casing comprises the portions 50 and 51 which are connected to each other with protrusion 51a pressed out of the material of portion 51. The casing portion 50 is mounted upon the sleeve 2 surrounding the shaft 1 by means of keys 3. The magnetic casing houses a magnetic coil 49. The windings of this coil are embedded in a coil casing 53 composed of insulating material. The coil casing 53 can be provided at one of its lateral faces with one or several protrusions 54 protruding into or through corresponding openings 52 in the portion 51 of the magnetic casing. The current supply lines 55 and 56 are insulatedly conducted to the outside through the center of these protrusions 54. The line 55 is connected to the magnetic casing at 57, for example by screw means, and the magnetic casing is grounded via the collecting ring 59. The live line 56 is connected with the collecting ring 60 at 58. The collecting ring 60 is embedded in an insulating layer 61.

According to the embodiment of the present invention shown in FIGURES 6 through 8 the cup-shaped member 15 of FIGURES 1 and 3 is replaced by a member 65 comprising an armature ring 66, a pressure plate 67, and a plurality of circumferentially spaced tie bolts 68. The armature ring 66 constitutes that portion of the member 65 which closes the magnetic circuit. The pressure plate 67 is adapted to contact the outermost disk 75a of the group of disks 75 and is adapted to press the group of disks 75 against the group of disks 76. The disks 76 are mounted on a driven sleeve r which is fixed by a key to the driven shaft s. The tie bolts 68 connect the armature ring 66 with the pressure plate 67.

Preferably, the bolts 68 are screwed into corresponding openings of the armature ring 66 with one of their respective ends. With their other ends the tie bolts protrude through a corresponding opening of the pressure plate 67 and the latter can be displaced along the tie bolts in an axial direction. Nuts 70 provided at the end of bolts 68 limit the movement of the pressure plate in the direction away from the group of disks 75. They are also used for adjusting the distance of the pressure plate 67 from the armature ring 66 is accordance with the wear of the disks.

Similar to the embodiment shown in FIGURE 1, a radially extending wall 77 of the portion 50 of the magnetic casing forms the abutment flange for the groups of disks 75 and 76. According to a second, principal feature of the embodiments shown in FIGURES 6 through 8 the cylindrically protruding sleeve 10 of the embodiment shown in FIGURE 1 is replaced by torque transmitting means consisting of circumferentially spaced axially extending arms 83. These arms 83 are in engagement with corresponding cut-outs in the peripheries of the outer group of disks 75 and transmit the torque from the driving shaft 1 to these disks, whereas the group of inner disks is connected to the driven shaft in the same manner as shown in the embodiment of FIGURE 1.

Preferably the axially extending arms 83 form one extension of the angular pieces 80, which also have a radial leg 81. The axially extending arms 83 of the angular pieces 80 are in engagement with the group of outer disks 75 and transmit the torque of the driving shaft to this group of disks.

The surface 78 of the wall 77 has radially extending grooves 79, receiving the legs 81 of the angular pieces 80, which legs 81 are firmly attached to the wall 77 by screws 82. The upper surfaces of the legs 81 are positioned in the same plane as the front surface 78 of the wall 77.

The armature ring 66 can be provided with radial grooves 84 (FIGURE 8) corresponding to the grooves 79 in the wall 77 and receiving with close lateral clearance the radially extending legs 81 of the angular pieces 80. By virtue of this arrangement the rotation of the magnetic casing is imparted to the armature ring and the armature ring is accurately centered relative to the neighboring portions of the magnetic casing.

It is also possible to so construct the portion 50 of the magnetic casing that the angular pieces 80 are an integral part of the wall 77, as if intermediate portions were cut out of the cylindrical sleeve 10 of the embodiment of FIGURE 1.

The pressure plate 67 has axially extending grooves 85 in which there are positioned the end portions of the axial arms 83 of the angular pieces 80. The lateral surfaces of these arms 83 cooperate with the lateral surfaces of the grooves 85 whereby the pressure plate is centered and is rotated with the magnetic casing.

According to another feature of the embodiment shown in FIGURES 6 through 8, the effective surface of the disks can be increased by positioning the armature and the torque transmitting means, for example the tie bolts 68 and the arms 83 of the angular pieces 80, on a circle with the same diameter, as shown in FIGURE 7, instead of on circles each having a different diameter.

FIGURE 6 shows the electro-magnetic coupling in its disconnected state in which the armature ring 66 and the portion 51 of the magnetic casing are spaced at a pre-determined distance forming the working air gap 86. The position of the armature ring 66 relative to the portion 51 is determined as far as the air gap is concerned in that the armature ring comes to rest with the inner surfaces of its grooves 84 against the radial legs 81 of the angular pieces 80. The surface of the armature ring which limits the working air gap 86 has a graduated configuration composed of a first surface 87, an intermediate annular groove 89 and a second surface 88. The main working gap 86a is limited by the surface portion 87 of the armature ring 66 and the surface 90 of the portion 51 of the magnetic casing.

In order to increase the area of transition of the magnetic flow from the wall 77 of the portion 50 of the magnetic casing to the armature ring 66 surrounding this wall at a very small distance, wall 77 can have an axially extending shoulder 91 partly surrounding the magnetic coil 49.

Operation

The embodiment of the electro magnetic coupling shown in FIGURES 6 through 8 which has just been described operates quite similarly to the embodiment shown in FIGURE 1.

As soon as current is supplied to the coil 49 via the collecting rings 59 and 60 a magnetic force is created between the surfaces 87, 88 of the armature ring and the surface 90 of the portion 51 of the magnetic casing, thereby attracting the armature ring 66 towards the portion 51. The drag is transmitted from the armature ring 66 via the tie bolts 68 to the pressure plate 67. The plate 67 is drawn towards the outermost disk 75a of the group of external disks 75 and presses the disks 75 against the disks 76 and finally against the wall 77 of the magnetic casing. As soon as the current to the coil is switched off, the pressure plate 67 is returned to its initial position by a force exerted by the inherent tension of the disks. This return motion of the plate 67 is imparted to the armature ring 66 via the tie bolts 68 and the armature ring 66 is thereby also returned to its initial position. This return movement of the plate 67 and the armature ring 66 can be facilitated by arranging pressure springs between the magnetic casing and the pressure plate similar to this shown in FIGURE 1 or by arranging expansion springs between adjoining exterior disks.

Figures 12A, 12B:
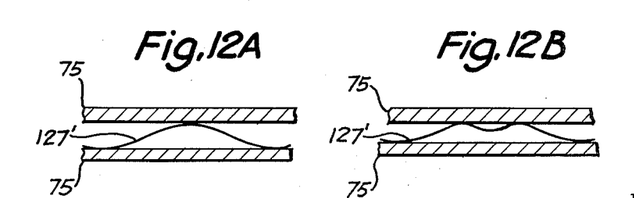
FIGURES 12A and 12B illustrate detailed views of a resilient connection between driven clutch disks of FIG. 10.

The expansion springs comprise a plurality of leaf springs 127' with each spring secured around the periphery of an exterior disk 75 at its ends so as to be bowed in the center (see FIG. 12A). The bowed center portions of the springs engage the next adjacent exterior disk. Upon movement of the plate 67 toward magnetic casing, the exterior disks are pressed together and the bowed center portions are compressed and urged to a flat position as in FIG. 12B. When the current is switched off, the return of plate 67 and the exterior disks 75 to their initial positions is assisted by the action of the expansion springs against adjacent exterior disks.

Figure 9:
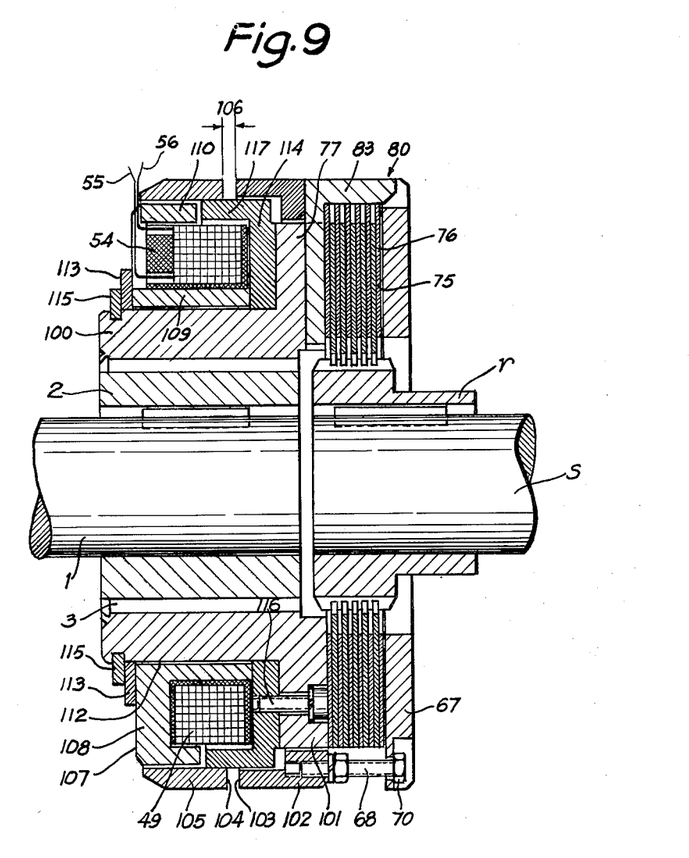
FIGURE 9 is a view partially in longitudinal section and partially in side view of another embodiment of the electro-magnetic clutch of the invention.
Figure 10:
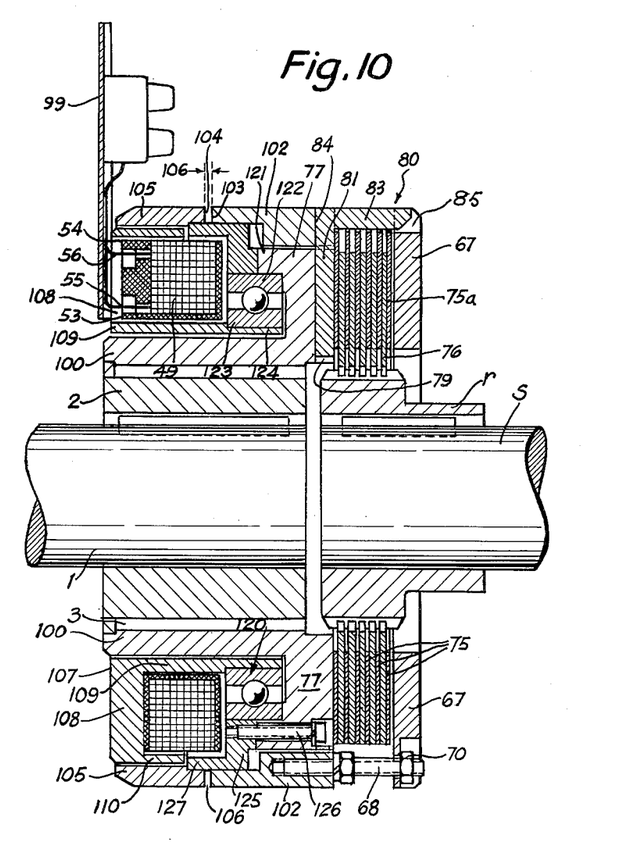
FIGURE 10 is a view partially in longitudinal section and partially in side view of a modification of the embodiment of the clutch shown in FIGURE 9.
Figure 13:
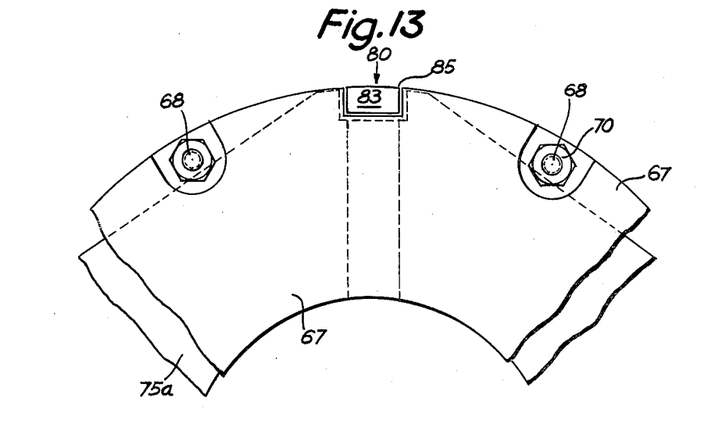
FIGURE 13 is a front view of a portion of the clutch shown in FIG. 10.
Figure 14:
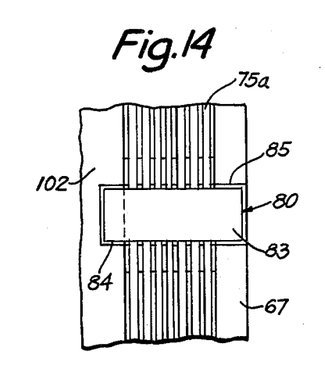
FIGURE 14 is a top view of a portion of a clutch common to FIGS. 10 and 13.

The electromagnetic coupling shown in FIGS. 10, 13 and 14 is the preferred embodiment of the invention. Unless otherwise stated, the following description can also be considered as describing the embodiment shown in FIG. 9.

There is first again a driver shaft 1 carrying a sleeve 2 and a driven shaft s carrying a sleeve r.

A magnetic casing having a cylindrical inner portion 100 and a radially extending wall 77 is mounted on sleeve 2 rotating therewith and shaft 1.

In this embodiment, the energization of the clutch or coupling is carried out by a stationary coil 49 mounted in a casing 53 which in turn is housed in a magnetic casing 107 having a cylindrical inner wall 109, a cylindrical outer wall 110, and a radially extending wall 108 thus defining a U-shaped cross-section.

Wall portion 54 of casing 53 defines an opening for a lead in wire 56 for coil 49. Another lead in wire 55 is insulatedly conducted to coil 49 near the inner wall portion of casing 53. 99 designates the stationary support secured to the machine frame (not shown) for the stationary coil housing or casing construction as just outlined.

The wall 77 has radially extending grooves 79 receiving legs 81 secured to the wall 77 therein. Each leg 81 is integral with an axially extending arm 83, the latter being received in a matching recess 85 of a pressure plate 67 for engagement thereof. Each arm 83 together with leg 81 constitutes an angular piece 80. Groups of discs 75 and 76 are alternately disposed between pressure plate 67 and wall 77, whereby discs 76 are secured to sleeve r while discs 75 are loosely seated and kept in axially aligned position by and rotating with the arms 83 by engagement thereof (see FIGS. 13 and 14).

75a designates the outermost disc of the group running with plate 67 and being juxtaposed thereto. There are provided no securing means between pressure plate 67 and wall 77. Loosely seated on a shoulder 121 of wall 77 is an armature ring 102 having corresponding grooves 84, aligned with grooves 79, each of such grooves receiving that portion of a leg 81 at which is joint arm 83. Pressure plate 67 is secured to armature ring 102 by means of tie bolts 68, extending in axial direction and kept in place adjustably by means of nuts 70. As one can see from FIG. 13 and the lower part of FIG. 10, the discs 75 are cut so that they do not interfere with bolts 68.

A non-magnetizable cup-shaped ring 125 is secured to shoulder 121 by means of screws 126 thus also rotating with wall 77 and cylinder portion 100 (FIG. 9 differs from FIG. 10 in this respect, see below).

Armature ring 102 is directly seated on this ring 125 to which is secured a cylindrical pole shoe 105. This pole shoe is centered without respect to casing shoulder 121 and it is in magnetic conductive relationship with the cylinder portion 110 of stationary casing 107. An air gap 106, the working air gap is defined in axial direction between armature ring 102 and pole shoe 105.

A comparison of FIG. 13 with FIG. 7 reveals, that also in the embodiment illustrated in FIGS. 10 and 13, the tie bolts 68 and the arms 83 of the angular pieces 80 are arranged on a circle with the same diameter.

At the end of the portion 100 towards the group of disks there is a radially extending wall 77 as described and also to be used for guiding the magnetic flow and simultaneously used as the abutment flange for the discs 75. For the purposes of conducting the magnetic flow the armature ring 102 constitutes a radial extension of the wall 77 as far as magnetic conduction and flow of flux is concerned, although spaced by a small air gap therefrom. The armature ring 102 is guided and accurately centered by the angular pieces 80 and it surrounds the circumference of the radially extending wall 77. Its distance from the wall 77 is sufficiently small, for example in the order of 0.1 mm. so that the magnetic flow is allowed to pass from the wall 77 onto the armature ring 102 substantially without encountering resistance. The working air gap 106 of the magnetic circuit is defined by the surface 103 of the armature ring 102 and the opposite front surface 104 of a tubular, external pole shoe 105 of the magnetic casing.

Figure 15:
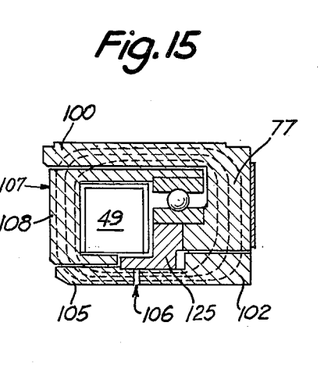
FIGURE 15 is a cross-section through a portion of the clutch of FIG. 10 illustrating the magnetic flux distribution.

From the foregoing, it will be apparent that the following elements are secured to and rotate with shaft 1: sleeve 2, casing 100—77—121, ring 125, race 122, pole shoe 105, and angular pieces 80; by engagement with the latter, particularly arm 83 thereof, pressure disc 67, and discs 75 follow this rotation; armature ring 102 being secured to disc 67 also runs therewith. Upon energization, discs 76, gear r and shaft s also follow the rotation. In FIG. 15 is shown a cross-section through the magnetically active elements of the clutch of FIG. 10 whereby the cross-section is to be understood as being angularly displaced, so that no bolt portions such as 68, or grooves such as 79 or 84 are visible. The dashed line through elements 77, 102, 105, 108, and 100 denotes the magnetic flux path. It is important, that the flux by-passes element 125 and thus runs straight across the working air gap 106.

Coil casing 107, 53, race 120 and coil 49 with its electrical connections remain stationary.

There are different modes of effecting the bearing of the stationary coil casing in the rotating magnetic casing one arrangement of which is shown in FIGURE 9 whereas an alternative is shown in FIGURE 10.

According to the embodiment shown in FIGURE 9 the inner cylinder surface of the wall 109 of the coil casing 107 is provided with a layer 112 of a bearing metal, as for instance bearing bronze. This layer serves as the bearing for the coil casing upon the cylindrical surface of the portion 100 of the magnetic casing. The layer of the bearing metal is preferably very thin, for example in the order of one tenth of one millimeter. Such thin layer offers substantially no resistance to the transition of the magnetic flow betwen the portion 100 and the magnetic casing 107.

The resistance to the magnetic flow can also be reduced in the area between the magnetic casing and the coil casing by providing the coil casing 107 with an outer cylindrical wall 110 increasing the area of transition for the magnetic flow between the coil casing 107 and the pole shoe 105.

Furthermore, it is of advantage to use two bearing rings 113 and 114 composed of a non-magnetizable material as for example brass, between which the coil casing 107 is arranged and guided. The bearing ring 113 is secured upon the cylindrical portion 100 by means of a snap ring 115. The cup-shaped bearing ring 114 is precisely centered upon the cylindrical portion 100 and is fastened to the radially extending wall 77 of the magnetic casing by means of screws 116.

It is also of advantage to employ a bearing ring 114 having an axially extending shoulder 117 at its outer end. This shoulder 117 surrounds the coil 49 at a small distance from the periphery of the latter and upon the outer surface of the free end of this shoulder 117 there is rigidly mounted the tubular pole shoe 105. Since the bearing ring 114 is accurately centered upon the coil casing 107, the pole shoe 105 is accurately centered by the bearing ring 114 and consequently the radially extending air gap between this pole shoe 105 and the cylindrical outer surface of the coil casing 107 can be kept very small, for instance 0.1 mm.

An alternative of the bearing arrangement of the coil casing 107 in the magnetic casing is shown in the preferred embodiment of the electro-magnetic coupling of the invention shown in FIGURE 10. In this embodiment, a ball bearing 120 having an outer raceway 122 and an inner raceway 123, is used as the bearing for the coil casing. The cylindrical inner side of shoulder 121 and ring 125 comes to rest against the outer raceway 122 of the ball bearing 120. The inner raceway 123 of the ball bearing 120 is supported by an elongated portion 124 of the interior concentric wall 109 of the coil casing 107 which is so arranged that the coil casing 107 surrounds the cylindrical portion 100 of the magnetic casing spaced therefrom at a very small distance, for instance in the order of 0.1 mm.

Similarly to the bearing ring 114 (of FIG. 9), the annular, cup-shaped ring 125 can also be provided with an axially extending shoulder 127 (corresponding to the shoulder 117 of the bearing ring 114 in FIGURE 9) and surrounding the coil 49 spaced at a small distance therefrom, and centering and supporting the pole shoe 105 with its free end.

In all of the various embodiments of the electro-magnetic coupling of the invention shown in FIGURES 6 through 11 it is of particular advantage to have the working air gap, i.e. the air gap 86 of FIGURE 6, or the working air gap 106 of FIGURE 9, located in the area between the ends of the coil 49 and preferably in the middle between the ends of the coil. For example, in FIGURE 6 the surface 87 of the armature ring 66 and the surface 90 of the portion 51 of the magnetic casing are so positioned above the coil casing 53 that the working air gap 86a is located substantially above the center of the coil casing 53 and is thus positioned in the area where the magnetic flow produced by the coil has already assumed an axial direction. In analogous manner, the surface 103 of the armature ring 102 of the embodiment shown in FIGURES 9 and 10 and the opposite surface 104 of the pole shoe 105 which define the working air gap 106 are so located that the working air gap is located in the area between the ends of the coil casing 107 and substantially above the center of the latter.

In order to have collecting rings of a sufficient width in spite of the positioning of the working air gap above the center of the coil casing and without increasing the overall dimensions of the magnetic casing the surface areas 87, 88, and 90 defining the working air gap can have a graduated configuration, as shown, for example, in FIGURE 6. The armature ring 66 has surfaces 88 and 87 with an intermediate groove portion 89 as already described further above, in connection with the description of FIGURE 6.

Figure 11:
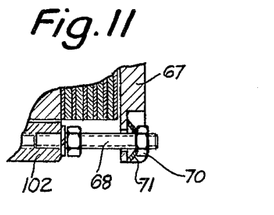
FIGURE 11 is a front view, partly in section, of a portion of the clutch and shows a resilient arrangement of the connection between the armature ring and the pressure plate used in the embodiments shown in FIG. 10 but also employable in the embodiments shown in FIGS. 6 and 9.

Furthermore, in the embodiments shown in FIGURES 6 to 11 pressure plate 67 and armature ring 102 can be connected resiliently. One mode of such a resilient connection is shown in FIGURE 11 in which spring plates 71 are arranged between the nut 70 of the tie bolt 68 and the pressure plate 67. These plates 71 can have similar resilient characteristics as schematically shown in FIGURE 2 and explained further above.

The electro-magnetic clutch of the present invention offers great advantages.

The masses of the torque transmitting members are reduced and the clutch is capable of transmitting the comparatively great amount of power, while accupying a comparatively small space and operating more efficiently.

The armature will return easily and rapidly to its initial operating position when the magnetic coil is being demagnetized without being prevented from doing so by the torque transmission in the clutch.

Due to the resilient portion in the armature, a time consuming adjustment of the coupling to allow for the wear of the friction disks is unnecessary.

Furthermore, in the described coupling there is provided a complete separation of the mechanical system serving for transmitting the torque from the magnetic system. Accordingly, the friction disks may not only be made of materials suited for dry running, but materials suited for running in oil and showing a correspondingly small degree of wear can be used as well.

An additional advantage of the arrangement according to my invention resides in the fact that all essential parts of the coupling can be made identically for either the embodiment of FIGURE 1 or that of FIGURE 3, thus permitting a rotational manufacturing of the apparatus. In the embodiments shown in FIGURES 1 and 3 the outer dimensions of the clutch are preferably maintained equal so that it is possible to build either the embodiment of FIGURE 1 or that of FIGURE 3 on one and the same machine tool as required.

For instance, it is of advantage in drives having a strong lubricant circulation to employ couplings without collector rings, since this eliminates the difficulty of an unobjectionable feeding of electric current via the collector rings in spite of a strong lubrication. The coupling according to my invention can, furthermore, be used in many ways, such as, for instance, as a brake for bringing rotating parts in machine tools to a quick standstill. The embodiment shown in FIGURE 1 is particularly suited for this purpose, however, the current leads would be stationary in this case, since, when the device is applied as a brake, the magnetic casing would be stationary.

The substantial reduction of the material forming the armature of the embodiment shown in FIGURE 6 wherein the armature is formed by a ring instead of an elongated sleeve and whose cross section is so adjusted that no resistance is offered to the magnetic flow results in a further decrease of the masses which have to be moved by the magnetic force upon switching in the current. As a result, the time used for effecting the coupling is even smaller than the time used for effecting the coupling with the embodiment of FIGURE 1 and it is very considerably smaller than the time used for effecting the coupling with known constructions.

The weight of the cup-shaped member is further reduced by employing axially extending arms 83 instead of an integral sleeve. Above all, this construction allows for a free and unobstructed passage of air from the outside through the coupling disk. During the operation of the electro-magnetic coupling the centrifugal forces create a circulation of air through the coupling disks and in this manner the heat created by the friction between these disks is efficiently carried away and an excellent cooling effect is accomplished.

The employment of angular pieces 80 of which the axial arms 83 form one of its two extensions insures an accurate centering of the armature ring 66 and hence the necessary air gap between the surface 77a of the wall 77 and the cylinder surface 66a of the armature ring 66 can be kept very small without incurring the risk of having these areas come into contact and magnetically stuck to each other. The resistance to the transition of a magnetic flow in this area is therefore greatly reduced.

The positioning of the axial arms 83 in the axial grooves 85 of the pressure plate 67 insures a direct connection of the plate with the magnetic casing for the transmission of the rotational movement from the magnetic casing to the plate. In addition, the plate is centered and guided during its axial movements.

The arrangement of the armature on the one hand and the tie bolts 68 and the axial arms 83 on the other hand upon a circle with one and the same diameter makes possible the employment of disks having a greater diameter and thereby an increased effective area of friction without enlarging the external diameter of the electro-magnetic coupling. The power transmitting capacity of the coupling is thereby greatly increased.

The embodiment of FIGURES 9 and 10 has several advantages due to the feature of the stationary coil of magnetizable material which forms a part of the magnetic circuit. Since the side 108 of the stationary coil casing 107 is freely accessible the current supply lines 55, 56 as well as the arm 99 can be easily mounted. The stationary coil casing does not warp even if considerable heat is created and consequently the elements displaced relative to each other, particularly the coil casing and the magnetic casing, can be arranged at a very small distance from each other. This is accomplished without having to provide additional space for the coil casing since this casing forms a part of the magnetic circuit.

The bearing means for the coil casing 107 consisting of a thin layer 112 can be so adapted and applied as such a thin layer that there is virtually no resistance to the magnetic flow.

The magnetic flow between the magnetic casing and the coil casing is further facilitated by the cylindrical shoulder 110 of the coil casing 107.

The bearing ring 114 of non-magnetizable material has the advantage of assuring an accurate centering of the pole shoe 105 and therefore the radially extending air gap between this pole shoe 105 and the cylindrical exterior surface of the coil casing 107 can be kept very small. In addition, the bearing ring 114 of non-magnetizable material prevents to a great extent a transition of the magnetic flow from the respective ends of the concentric walls 109 and 110 in an axial direction upon the radially extending wall 77. Thereby the danger of a scattering of the magnetic forces is eliminated and the magnetic forces are used to their fullest extent. Furthermore, the creation of axial forces between the coil casing and the magnetic casing is excluded.

The bearing arrangement employing the ball bearing 120 is capable of insuring a mounting of the coil casing 107 at a very small distance from the cylindrical portion of the magnetic casing.

The advantages of the ring 125 correspond to the advantage brought about by the bearing ring 114.

The axially extending shoulders 117 and 127, respectively, afford a support and an accurate centering means for the pole shoe 105.

The location of the working air gap 86, and 106, respectively, between the ends and preferably in the center above the ends of the coil casing offers the advantage of positioning the air gap in an area in which the magnetic flow produced by the coil already has assumed an axial direction. This makes for a better utilization of the magnetic flow.

The graduated configuration of the surface areas defining the working air gap, and for example the structure of the surfaces 87, 88, and 89 of the armature ring 66 preserves the sufficient width of the collecting ring, for instance the collecting ring 59, in the case where the working air gap has been positioned between the ends of or in the center between the ends of the coil casing and simultaneously preserves the smallest possible outer dimensions of the magnetic casing.

The resilient connections between the plate 67 with the armature ring, for example by the spring plate 71, is the same as the advantage brought about by the resilient connection shown in the embodiment of FIGURE 1.

The electro-magnetic clutch of the present invention can be used for a variety of other purposes as, for example, as a brake used for bringing rotating elements, for example in machine tools, to a quick halt. This can be done with only such minor adaptations which are well within the reach of persons skilled in the art.

It will be understood that this invention is susceptible to further modifications in order to adapt it to other usages and conditions, and accordingly, it is desired to comprehend such modifications within this invention as may fall within the scope of the appended claims.

What I claim is:

1. An electro-magnetic clutch for connecting driving and driven members comprising in combination a magnetic casing mounted on the driving member, a plurality of circumferentially spaced arms axially extending from said magnetic casing, a plurality of driving disks drivingly connected to said arms, a plurality of driven disks alternating between said driving disks and connected with said driven member, an axially displaceable disk-actuating means comprising a radially extending disk-contacting plate located on the side of said disks remote from said magnetic casing, an armature ring in magnetically conductive relationship with said magnetic casing and slidably mounted thereon, axially extending means connecting said disk-contacting plate and said armature ring, and a coil positioned within said magnetic casing to produce a magnetic circuit through said magnetic casing and said armature ring, there being an annular air gap between said casing and said armature ring penetrated by magnetic flux lines in axial direction.

2. An electro-magnetic clutch for connecting driving and driven members comprising in combination a magnetic casing mounted on the driving member, a plurality of circumferentially spaced arms axially extending from said magnetic casing, a plurality of driving disks drivingly connected to said arms, a plurality of driven disks alternating between said driving disks and connected with said driven member, an axially displaceable disk-actuating means comprising a radially extending disk-contacting slate located on the side of said disks remote from said magnetic casing, an armature ring slidably mounted on said magnetic casing and rotating therewith, a stationary coil casing of magnetizable material, a radially extending ball bearing journalling said coil casing on said magnetic casing, said coil casing comprising an axially extending cylindrical wall and a radially extending outer wall, said axially extending wall being journalled around said magnetic casing, and a coil within said coil casing to produce a magnetic circuit through said magnetic casing, said coil casing, and said armature ring of said disk-actuating means there being an annular air gap between said casing and said armature ring penetrated by magnetic flux lines in axial direction.

3. An electro-magnetic clutch as claimed in claim 2 and further comprising a cup-shaped ring of non-magnetizable material fixed to said magnetic casing and facing the axial inner end of said coil casing, and an axially extending pole shoe supported by the outer end of said cup-shaped ring.

4. An electro-magnetic clutch for connecting driving and driven members comprising: a magnetic casing having a cylindrical portion mounted on said driving member, said magnetic casing further having a radially extending wall integral with said cylindrical portion, a plurality of circumferentially spaced arms axially extending outwardly from said wall in a direction away from said cylindrical portion, a plurality of driving disks drivingly engaged by said arms, a plurality of driven disks alternating between said driving disks and connected with said driven member, an axially displaceable disk-actuating means comprising a radially extending disk-contacting plate located on the side of said disks remote from said magnetic casing, an armature ring slidably mounted on said wall and rotating therewith, axially extending tie bolts arranged upon the circumference of the circle defined by said axially extending arms connecting said disk-contacting plate and said armature ring, and a coil disposed within said magnetic casing to produce a magnetic circuit through said magnetic casing and said armature ring, there being an annular air gap between said armature ring and said casing penetrated by magnetic flux lines in axial direction.

5. An electro-magnetic multiple-disk clutch for connecting driving and driven members comprising: a magnetic casing having a cylindrical portion mounted on said driving member, said magnetic casing further having a wall connected to said cylindrical portion, a plurality of circumferentially spaced arms axially extending from said wall outwardly from said magnetic casing away from said cylindrical portion, a plurality of driving disks drivingly connected to said arms, a plurality of driven disks alternating between said driving disks and connected with said driven member, said assembly of driving and driven disks having an innermost and an outermost disk with said innermost and outermost disks being driving disks, an axially displaceable disk-actuating means comprising a radially extending disk-contacting plate located on the side of said disks remote from said magnetic casing, an armature ring slidably mounted on said wall rotating therewith, axially extending means connecting said disk-contacting plate and said armature ring, and a coil disposed within said magnetic casing to produce a magnetic circuit through said magnetic casing and said armature ring, there being an annular air gap between said armature ring and said casing penetrated by magnetic flux lines in axial direction.

6. An electro-magnetic clutch for connecting driving and driven members comprising in combination a magnetic casing mounted on the driving member, a plurality of angular pieces each comprising a radially extending leg mounted upon said magnetic casing and an axially extending arm, said arms being circumferentially spaced, a plurality of driving disks mounted upon said arms for rotation therewith but axially displaceable thereon, a plurality of driven disks alternating between said driving disks and connected with said driven member, an axially displaceable disk-actuating means comprising a radially extending disk-contacting plate located on the side of said disks remote from said magnetic casing, said plate being engaged by said arms for common rotation, an armature ring slidably mounted on said magnetic casing and being in magnetically conductive relationship therewith, axially extending means connecting said disk-contacting plate and said armature ring, and a coil positioned within said magnetic casing to produce a magnetic circuit through said magnetic casing and said armature ring, there being an annular air gap between said casing and said armature ring penetrated by magnetic flux lines in axial direction.

7. An electro-magnetic clutch as claimed in claim 4 and further comprising an outer sleeve-like pole shoe mounted on an outer axially extending surface of said radially extending wall of the magnetic casing, the pole shoe and the armature ring having adjacent surfaces defining the annular air gap, said air gap being radially displaced from said coil.

References Cited in the file of this patent

UNITED STATES PATENTS

| | | |
|---|---|---|
| 762,622 | Eastwood | June 14, 1904 |
| 2,039,714 | Fuller | May 5, 1936 |
| 2,209,776 | Kiekhaefer | July 30, 1940 |
| 2,217,357 | Coe | Oct. 8, 1940 |
| 2,380,572 | Barron | July 31, 1945 |
| 2,606,638 | Russell | Aug. 12, 1952 |
| 2,729,317 | Schwab | Jan. 3, 1956 |
| 2,847,102 | Tiedeman et al. | Aug. 12, 1958 |
| 2,875,875 | Prahauser | Mar. 3, 1959 |
| 2,893,528 | Ryba | July 7, 1959 |
| 2,899,036 | Ryba | Aug. 11, 1959 |
| 2,912,088 | Breyer | Nov. 10, 1959 |
| 2,956,657 | Rudisch | Oct. 10, 1960 |
| 2,966,975 | Weidmann et al. | Jan. 3, 1961 |

FOREIGN PATENTS

| | | |
|---|---|---|
| 12,259 | Great Britain | of 1910 |
| 261,660 | Germany | June 28, 1913 |
| 358,238 | Great Britain | Oct. 8, 1931 |
| 734,932 | Germany | May 3, 1943 |
| 594,906 | Great Britain | Nov. 21, 1947 |
| 653,334 | Great Britain | May 16, 1951 |
| 851,874 | Germany | Oct. 9, 1952 |
| 852,792 | Germany | Oct. 20, 1952 |
| 179,931 | Austria | Oct. 25, 1954 |
| 184,786 | Austria | Feb. 25, 1956 |
| 1,130,997 | France | Oct. 8, 1956 |
| 1,173,007 | France | Feb. 18, 1959 |